United States Patent [19]

Haartsen et al.

[11] Patent Number: 5,940,431
[45] Date of Patent: *Aug. 17, 1999

[54] ACCESS TECHNIQUE OF CHANNEL HOPPING COMMUNICATIONS SYSTEM

[75] Inventors: Jacobus C. Haartsen, Staffanstorp, Sweden; Paul W. Dent, Pittsboro, N.C.

[73] Assignee: Telefonaktiebolaget LM Ericsson, Stockholm, Sweden

[ * ] Notice: This patent issued on a continued prosecution application filed under 37 CFR 1.53(d), and is subject to the twenty year patent term provisions of 35 U.S.C. 154(a)(2).

[21] Appl. No.: 08/771,692

[22] Filed: Dec. 23, 1996

[51] Int. Cl.$^6$ ................................................ H04B 1/713
[52] U.S. Cl. ................. 375/202; 455/38.3; 340/825.73; 370/311
[58] Field of Search ................. 375/200, 201, 375/202, 206; 370/203, 208, 209, 311, 313, 320, 335, 342, 441, 462, 463, 464, 479, 480; 455/31.1, 38.1, 38.2, 38.3, 38.5, 434, 458; 340/825.48, 825.71, 825.73, 825.75, 825.76

[56] References Cited

U.S. PATENT DOCUMENTS

| | | | |
|---|---|---|---|
| 4,578,816 | 3/1986 | Rabain et al. | 380/34 |
| 4,677,617 | 6/1987 | O'Connor et al. | 370/478 |
| 5,353,341 | 10/1994 | Gillis et al. | 455/464 |
| 5,430,775 | 7/1995 | Fulghum et al. | 375/202 |
| 5,432,814 | 7/1995 | Hasegawa | 375/202 |
| 5,528,623 | 6/1996 | Foster, Jr. | 375/202 |

FOREIGN PATENT DOCUMENTS

| | | |
|---|---|---|
| 0082054A1 | 6/1983 | European Pat. Off. . |
| WO96/08941 | 3/1996 | WIPO . |

*Primary Examiner*—Temesghen Ghebretinsae
*Attorney, Agent, or Firm*—Burns. Doane, Swecker & Mathis, L.L.P.

[57] ABSTRACT

Establishing a connection between a paging unit and a standby unit in a channel hopping communications system includes activating the standby unit for an activation time period out of every standby time period. During each activation time period, the standby unit monitors a selected channel for receipt of a paging message. The selected channel is selected from a plurality of channels, and, for each subsequent activation time period, the selected channel is a subsequent one of the plurality of channels as specified by a hopping sequence and an internal clock. A page train is repeatedly transmitted from the paging unit to the standby unit, until a response is received from the standby unit. Each page train includes a plurality of paging messages, each paging message being transmitted on a different one of a subset of the plurality of channels. Selection of a page train for transmission by the paging unit may be based on an estimate of the standby unit's internal clock.

86 Claims, 11 Drawing Sheets

N=4; M=4

ACCESS TECHNIQUE OF CHANNEL HOPPING COMMUNICATIONS SYSTEM

BACKGROUND

The present invention relates to communications systems applying slow frequency hopping, and more particularly to a procedure for synchronizing two frequency hopping units to each other in order to establish a communication link.

Frequency hop (FH) spreading has been an attractive communications form in military applications for a long time. By sending signals sequentially in different parts of the radio spectrum in a pseudo-random way, both high security against eavesdropping, and immunity against narrowband interferers is obtained. With the advent of fast, cheap, and low-power synthesizers, FH transceivers are becoming commercially attractive, and are used more and more in civil applications as well. For certain wireless radio systems, FH is especially attractive because of its immunity to unknown interference and to Rayleigh fading. Examples are radio systems using unlicensed bands like the Industrial, Scientific and Medical (ISM) bands at 900, 2400 and 5700 MHz. Because the radio communications are unregulated in these bands (apart from some transmission power restrictions), communication systems using this band must be capable of sustaining any (i.e., a priori unknown) interference. FH appears to be an attractive tool in fighting the interference.

Two types of FH systems can be distinguished: slow FH and fast FH. In slow-FH communications, a burst of symbols is transmitted in a hop; thus, the symbol rate is higher than the hop rate. In fast-FH, a single symbol is spread over several hops, so that the hop rate is higher than the symbol rate. Fast-FH puts high requirements on the speed of the transceiver electronics, especially at higher symbol rates. Therefore fast-FH is not attractive for portable usage because of higher power consumption. Slow-FH provides all the system features required in a wireless communications system, that is, interference immunity and fading immunity.

For a FH connection to operate, synchronization between the two hopping transceivers is required: the transmission (TX) hop of one unit must be the receive (RX) hop of the other unit, and vice versa. Once the two units are locked, they just use the same hop sequence at the proper rate in order to maintain the connection. However, a problem is to get the two units synchronized initially. When there is no connection, a portable unit is usually in a standby mode. In this mode, it sleeps most of the time, but periodically it wakes up to listen for paging messages from units that want to connect. A problem with a FH scheme is that the paging unit does not know when and on what hop channel the unit in standby will listen for paging messages. This results in an uncertainty both in time and in frequency.

Conventional techniques have attempted to solve the problem of establishing a connection between a paging unit and a unit in standby mode. In U.S. Pat. No. 5,353,341 issued to Gillis, a single reserved hop channel is used for access. The paging unit always sends paging messages out on this single reserved channel, and when the standby unit periodically wakes up, it only monitors the one reserved channel. Because there is no hopping of the access channel, there is no frequency uncertainty. However, this strategy has the drawback of lacking the benefits that an FH strategy can provide: When the reserved channel is disturbed by a jammer, no access can take place.

U.S. Pat. No. 5,430,775 to Fulghum et al. discloses a system in which reserved channels are used as agreed upon by sender and recipient. In this case, there are two reserved channels: one to "reserve" the access channel, and the other is the access channel itself. The access process lacks the benefits that FH can provide because both the reservation and the access channel do not hop, but are instead constant.

U.S. Pat. No. 5,528,623 to Foster, Jr. discloses a system in which both the sender and the recipient hop in the access procedure, thereby providing the full benefits of a FH scheme. However, in this system the recipient is required to hop quickly during the wake-up period, while the paging unit hops slowly. As a result, this system has the undesirable effect of requiring the recipient (i.e., the unit in standby) to expend a relatively large amount of power during every wake-up period, just to check to see whether it is being paged. Another apparent shortcoming of the system as described by Foster, Jr. is that there is no explanation of how the return message from the recipient to the sender is arranged. That is, a 3.3 ms return period is defined in which the sender listens for a response; but upon receipt of the page message, the recipient does not know when this 3.3 ms listening period starts.

SUMMARY

It is therefore an object of the present invention to provide an access method for units applying a FH scheme which allows the standby unit to have a low duty cycle on the sleep/wake-up period, thus providing a low-power standby mode, but at the same time limits the access delay in setting up a connection.

In accordance with one aspect of the present invention, the foregoing and other objects are achieved in a method for establishing a connection between a paging unit and a standby unit in a channel hopping communications system, the method comprising the steps of activating the standby unit for an activation time period, $T_{wake}$, out of every standby time period, $T_{standby}$. During each activation time period, the standby unit monitors a selected channel for receipt of a paging message, wherein the selected channel is selected from a plurality of channels, and wherein, for each subsequent activation time period, the selected channel is a subsequent one of the plurality of channels as specified by a hopping sequence. A page train is repeatedly transmitted from the paging unit to the standby unit, until a response is received from the standby unit. Each page train comprises a plurality of paging messages, each paging message being transmitted on a different one of a subset of the plurality of channels.

In another aspect of the invention, the subset of channels for each page train are ordered as specified by the hopping sequence. The hopping sequence may, for example, be a pseudo-random sequence.

In the above-described method, the selection of a channel to be monitored by the standby unit may be a function of a value of a free-running clock in the standby unit; and the page train may be selected from a plurality of page trains, the selection being a function of a value of a free-running clock in the paging unit.

In another aspect of the invention, different page trains may be selected for use during different standby time periods, the different page trains being transmitted on different subsets of channels. Selection of a page train for use during any particular standby time period may be made in a manner that resolves the time uncertainty between the free-running clocks in the paging and standby units.

For example, in one embodiment of the invention, each page train is transmitted on a subset of channels that are selected from the plurality of channels in accordance with the following equation:

$$\text{train } i=\{hop_{modN}(k_p+iM), hop_{modN}(k_p+(iM+1)), \ldots, hop_{modN}(k_p+iM+(M-1))\}$$

where $k_p$ is a clock value of the paging unit, the paging unit clock value being updated every $T_{standby}$ period, N is the number of channels in the hopping sequence, $T_{page}$ is the duration of a page message, $M=INT(T_{wake}/T_{page})-1$, where M is the number of page messages per page train and where INT( ) is a function that leaves only the integer part of a variable and, the number of different page trains, $N_T$, is given by $N_T=RNDUP(N/M)$, where RNDUP( ) is a function that rounds any non-integer value up to the nearest integer, $i=0, \ldots (N_T-1)$, and $hop_{modN}(x)=hop(x \bmod N)$.

In another embodiment of the invention, each page train is transmitted on a subset of channels that are selected from the plurality of channels in accordance with the following equation:

$$\text{train } i=\{hop_{modN}(k_s'-\alpha+iM), hop_{modN}(k_s'-\alpha+iM+1), \ldots, hop_{modN}(k_s'-\alpha+iM+(M-1))\}$$

where $k_s'$ is an estimate of a clock value of the standby unit, the standby unit's clock value being updated every $T_{standby}$ period, $\alpha$ is a fixed offset value larger than zero, N is the number of channels in the hopping sequence, $T_{page}$ is the duration of a page message, $M=INT(T_{wake}/T_{page})-1$, the number of page trains, $N_T$, is given by $N_T=RNDUP(N/M)$, where INT( ) is a function that leaves only the integer part of a variable and RNDUP( ) is a function that rounds any non-integer up to the nearest integer, $i=0, \ldots, (N_T-1)$, and $hop_{modN}(x)=hop(x \bmod N)$.

The estimate of the internal clock of the standby unit may be derived, for example, from the present internal clock value of the paging unit, adjusted by a previously determined clock offset between the standby unit and the paging unit clock values.

BRIEF DESCRIPTION OF THE DRAWINGS

The objects and advantages of the invention will be understood by reading the following detailed description in conjunction with the drawings in which.

DETAILED DESCRIPTION

Figure 1:
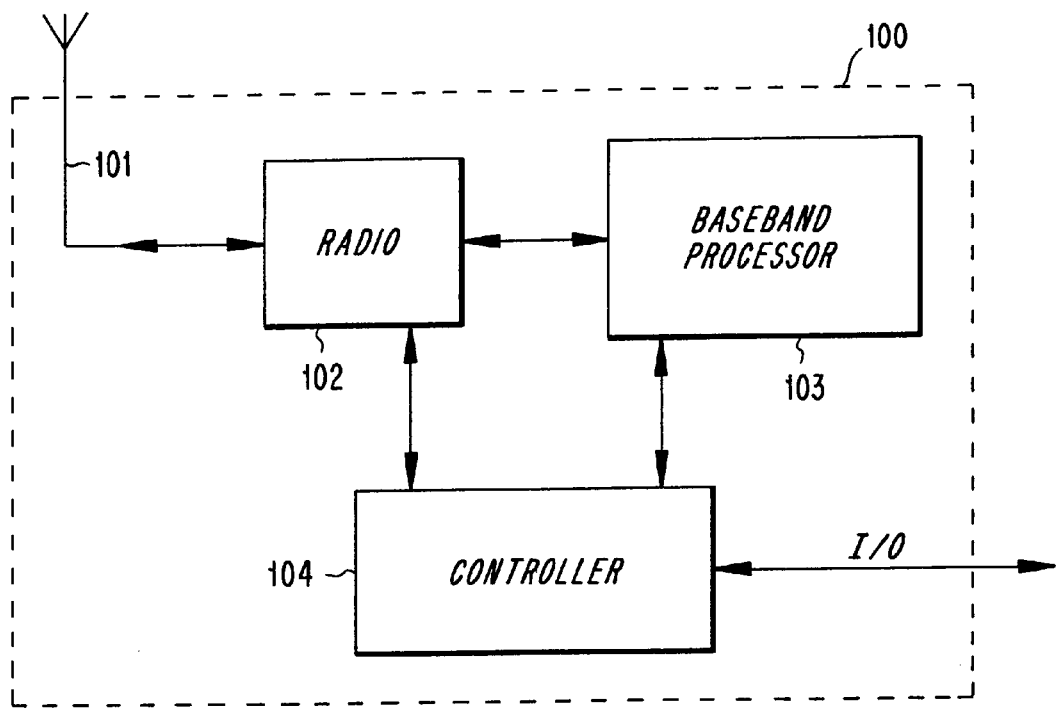
FIG. 1 is a block diagram of a frequency-hopping transceiver in accordance with the invention.

The various features of the invention will now be described with respect to the figures, in which like parts are identified with the same reference characters.

The invention proposes an access procedure in which minimal activity is required in the unit in standby mode, thus resulting in low-power standby mode. The unit that is trying to get access has to resolve the time uncertainty problem. This is achieved by repeatedly transmitting paging messages at different channel hops (e.g., frequency hops) until reception is acknowledged by the recipient. The search by the paging unit can be reduced considerably by estimating the wake-up time and wake-up hop of the standby unit. This is achieved by the application of free-running clocks in the communication units. A unit in standby wakes up at regular intervals in hop channels defined by a pseudo-random wake-up sequence. A free-running clock in the unit determines when and on what hop channel in the wake-up sequence the unit wakes up to monitor for paging messages. If the paging unit can estimate the recipient's clock, it can estimate when and on which hop it wakes up, thus reducing the access delay.

The accuracy of the clock estimate depends on the relative drift of the clocks in the two units, and on the time elapsed since the two units exchanged their internal clock values during a connection. The larger the drift and the longer the elapsed time, the larger the uncertainty in time and frequency, and the longer the search process will take. In the proposed system, the clocks are free running and never adjusted. Only clock offsets are used in the estimation process. In this way, a unit will have a list of clock offsets with respect to a number of other units that it has been connected to in the past.

Figure 2B:
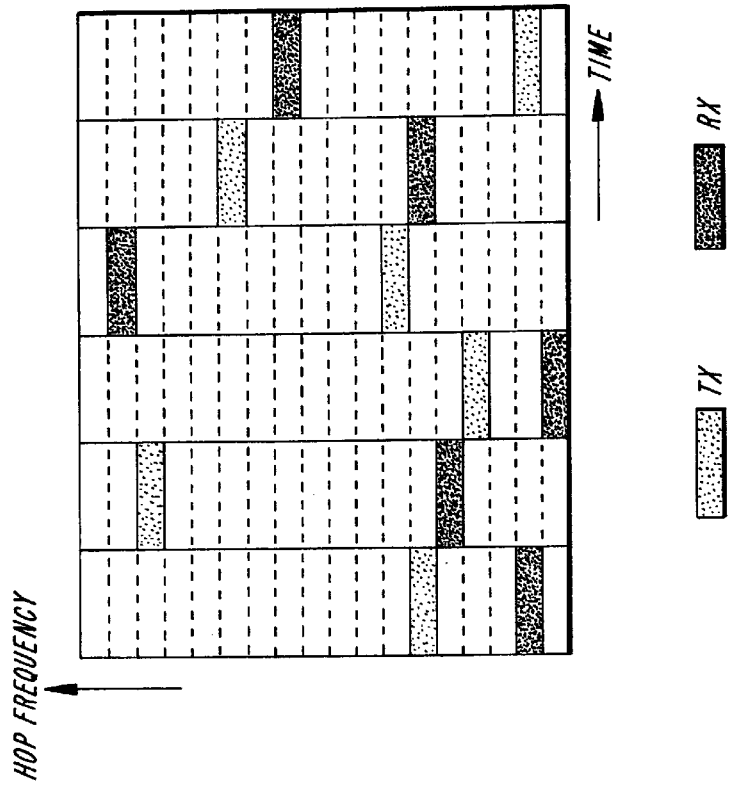
FIGS. 2a and 2b illustrate prior art examples of duplex FH links utilizing time division duplex and frequency division duplex, respectively.
Figure 2A:
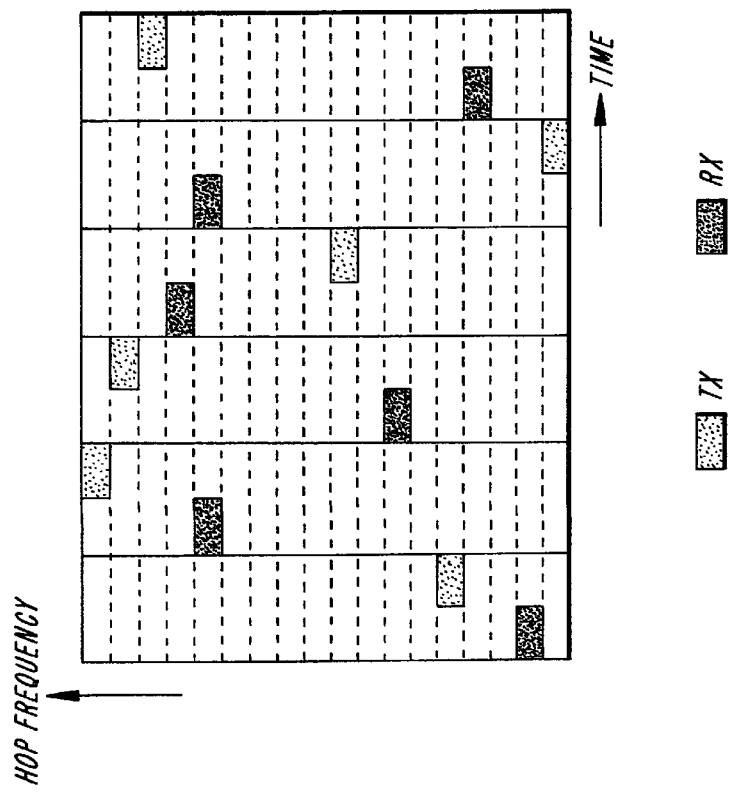

To facilitate an understanding of the invention, a slow-FH communication system will be considered. An example of a frequency-hopping (FH) transceiver 100 in accordance with the invention is shown in FIG. 1. The transceiver 100 includes an antenna 101, a radio 102, a baseband processor 103, and a controller 104. The baseband processor 103 provides frames of information bits to the radio 102. The radio 102 then modulates and upconverts the modulated signal to the proper hop frequency, and transmits the signal via the antenna 101. The radio 102 transmits the TX frames in different hop frequencies according to a pseudo-random FH sequence. In case of a full-duplex link, RX frames are either received in between the TX frames in the case of a time-division duplex (TDD) link, or else they are received simultaneously with the transmission of the TX frame in the case of a frequency-division duplex (FDD) link. In case of FDD, the TX hop and RX hop cannot be identical. Examples of duplex FH links utilizing TDD and FDD, respectively, are shown in FIGS. 2a and 2b. The controller 104 controls the components of the transceiver 100 in accordance with the principles fully described below.

Figure 3:
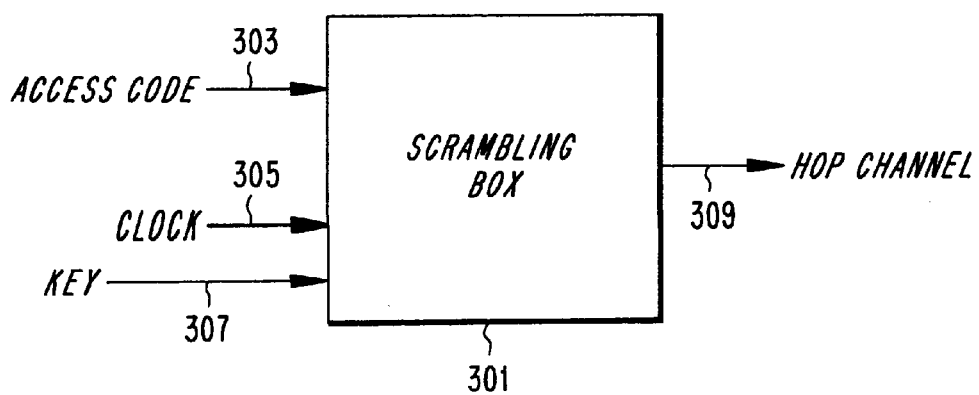
FIG. 3 is a block diagram of conventional means for performing hop selection.

To minimize interference between transceivers supporting different links, each link applies a unique hop sequence. The cross correlation between different hop sequences should be small in order to minimize collisions of frames of different links. Error correction protocols to overcome collisions should be implemented in higher-layer link protocols. In an exemplary system, each transceiver has a unique access code and a free-running clock. The access code can be considered as the user address. The access code selects the FH sequence that will be used, the clock determines the phase in the sequence, that is, which particular hop of the sequence is selected at a specific time. An embodiment of conventional means for performing hop selection is shown in FIG. 3. This figure shows a scrambling box 301 in which a hop channel is derived from the supplied clock 305, an access code 303, and (optionally) a unique (encryption) key ($K_e$) 307 in a pseudo-random way. Each time the clock 305 is updated, a new hop channel 309 is selected according to the pseudo-random algorithm implemented in the scrambling box.

Two units that are connected will use the same access code, the same clock and, if present, the same key, $K_e$, for the duration of the connection. Once connected, a mechanism must be applied to keep the two clocks synchronized. This can, for example, be achieved by synchronization bit-sequences in the frame headers that indicate an early or late reception, which can then be used to slow down or speed up the clock rate, respectively. If a leaky mechanism in the clock update is applied, the two units will be loosely coupled at an intermediate clock rate.

The problem with FH systems lies in the initial synchronization of the two transceivers. A transceiver in portable applications usually resides in a standby mode when no connection is present. In this mode, the transceiver should perform very little activity in order to minimize the power consumption. The only procedure to be carried out in the standby mode is to monitor the radio channels for paging messages at regular intervals. To save power consumption, it is desirable for standby mode to have the following characteristics:

1) The duty cycle for wake-up interval/sleep interval should be low (say 1%), so that most of the time the standby unit does not perform any activity at all, but instead merely sleeps.
2) During the wake-up interval $T_{wake}$, the unit should engage only in monitoring activity, and should not transmit any signals.
3) During the wake-up interval $T_{wake}$, the unit should wake up on a single hop frequency only.
4) Each new wake-up time, the unit should wake up in a different hop frequency according to a pseudo-random hop sequence.

Figure 4:
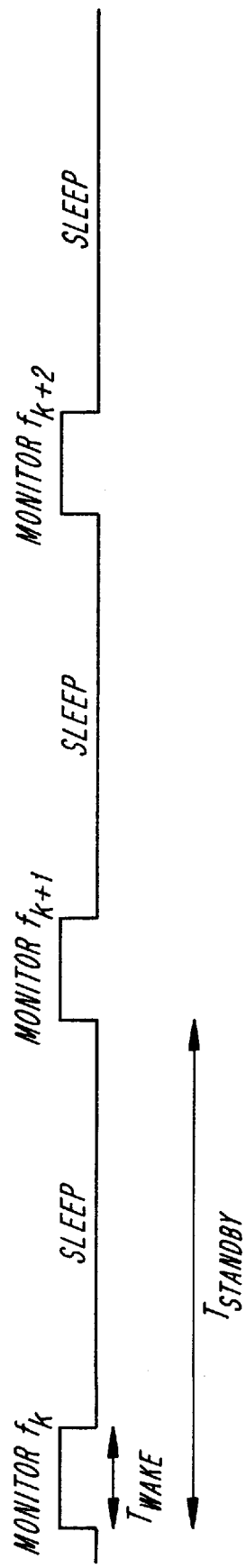
FIG. 4 is a timing diagram of a transceiver's standby activity, in accordance with one aspect of the invention.

An example of the transceiver's standby activity in accordance with one aspect of the invention is shown in FIG. 4. Every $T_{standby}$ seconds, the receiver section of the radio 102 in the unit wakes up and monitors on a single hop frequency $f_k$ for $T_{wake}$ seconds. The selected hop frequency is determined by the user address, the unit's clock value, k, and (optionally) a unique (encryption) key ($K_e$). The standby clock is updated every $T_{standby}$ seconds; therefore, at each new wake-up instance, a new hop frequency is monitored.

Another unit seeking contact (i.e., a paging unit) has to reach the unit in standby with its paging message. The paging unit does not know when the unit in standby mode will wake up or in what hop frequency it will wake up. Consequently, the paging unit has to resolve the time/frequency uncertainty. This will require quite some effort (=power consumption) from the paging unit, but since paging only happens once in a while, compared to the standby mode, which can last forever, putting most of the activity for a call setup in the paging process and not in the standby process is preferred.

The call-setup delay is determined by the amount of uncertainty in time and frequency. In order to reduce the delay, the uncertainty must be restricted. In accordance with a first aspect of the invention, this is achieved by using a hop sequence in the standby mode of finite length N, say $S=\{f_1, f_2 \ldots f_N\}$, where $f_k$ is a hop channel. The receiver applies the hops in a sequential manner: each time the clock is incremented, the next hop in the sequence is selected. After $f_N$, the unit starts with $f_1$ again, and so on. Thus, the clock only has to count modulo N. The smaller N is, the smaller the frequency uncertainty is, but the less interference immunity is obtained. To minimize the uncertainty in time, it is preferred that all hop frequencies in the sequence be unique, that is $f_k=f_m$ if and only if k=m. This means that if the two units happen to land on the same hop frequency, they will be automatically synchronized, provided the same hop sequence and same hop rate are applied thereafter.

Figure 5:
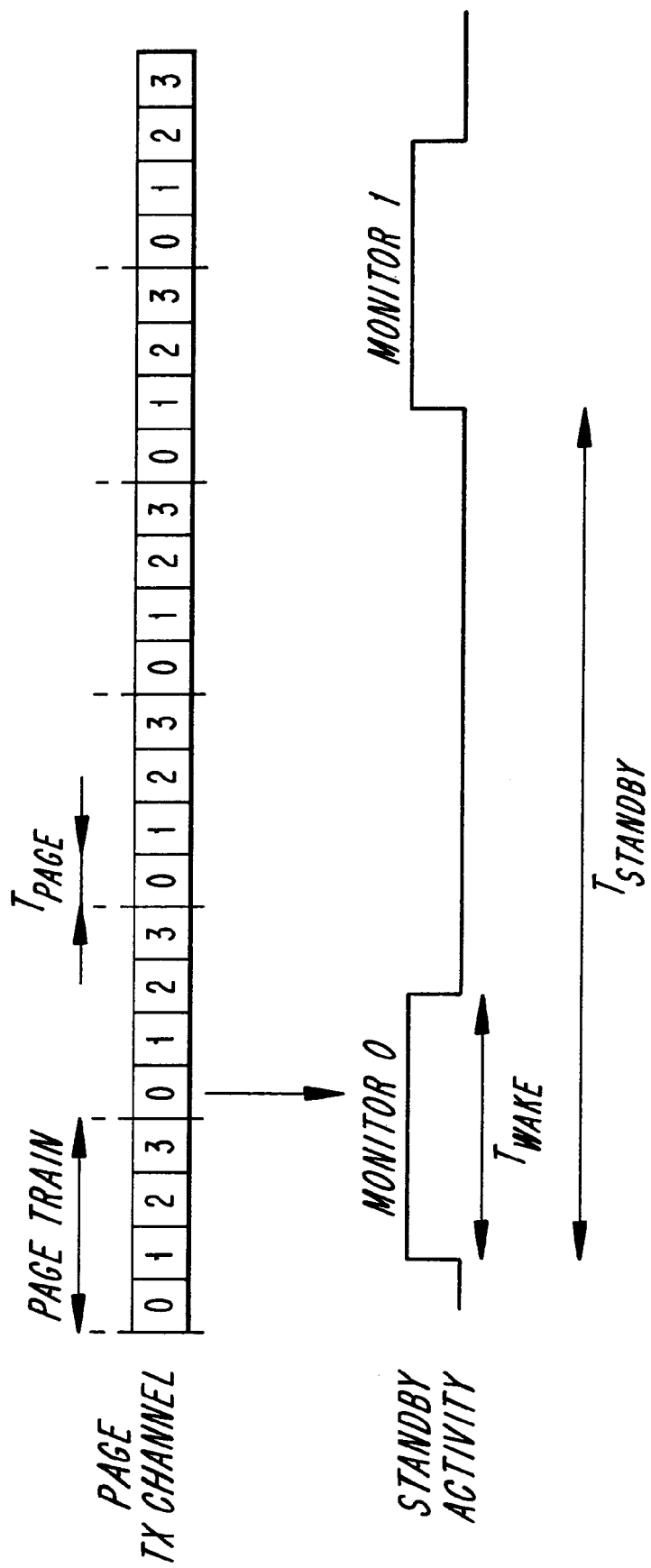
FIG. 5 is a timing diagram that illustrates the repeated transmission of a page train, in accordance with one aspect of the invention.

The hop sequence S is determined by the user address of the standby unit, so the paging unit will use this same address in order to apply the same hop sequence as the standby unit. If we assume that the standby unit's clock is unknown to the paging unit, the paging unit does not know when the standby unit will wake up and what phase it will be using in the sequence S. The best it can do is to transmit paging messages on as many different hop frequencies as possible during a wake-up period, $T_{wake}$. Suppose the duration of a page message is $T_{page}$. In this case, the paging unit can send $INT(T_{wake}/T_{page})$ page messages at different hop frequencies, where INT( ) is a function that leaves only the integer part of an input variable. In order to assure that each page message falls at least once completely in the wake-up period, the number of hops, M, in a so-called page train is preferably $M=INT(T_{wake}/T_{page})-1$. A page train is defined as a block of page messages, each page message being transmitted at a different hop frequency. The page messages in a page train are preferably identical to one another. Since the time of wake up is unknown to the paging unit, it should repeatedly transmit a page train until it receives a response from the other unit. An example of this aspect of the invention is shown in FIG. 5. In this example, a page train of length M equal to 4 is shown. In each hop, a page message (not shown) is transmitted which includes the recipient's unique address. If the hop sequence is also of length N=4, then the paging unit reaches the standby unit at least within the standby period $T_{standby}$.

To satisfy both the low duty cycle in standby mode and the interference immunity in general, it is usually the case that N>M. This means that, unlike the previous example, the entire hop sequence cannot be covered with a single page train. Therefore, more than one page train is needed. To this end, a number of page trains are defined that, when taken together, cover the entire hop sequence. Since the paging unit does not know when the standby unit will wake up, changes from one transmitted page train to another should not be made any more frequently than once every standby period $T_{standby}$. This will ensure that each page train at least overlaps a wake-up period. If no response is received after a time period $T_{standby}$, the paging unit can then switch to another page train.

Figure 6:
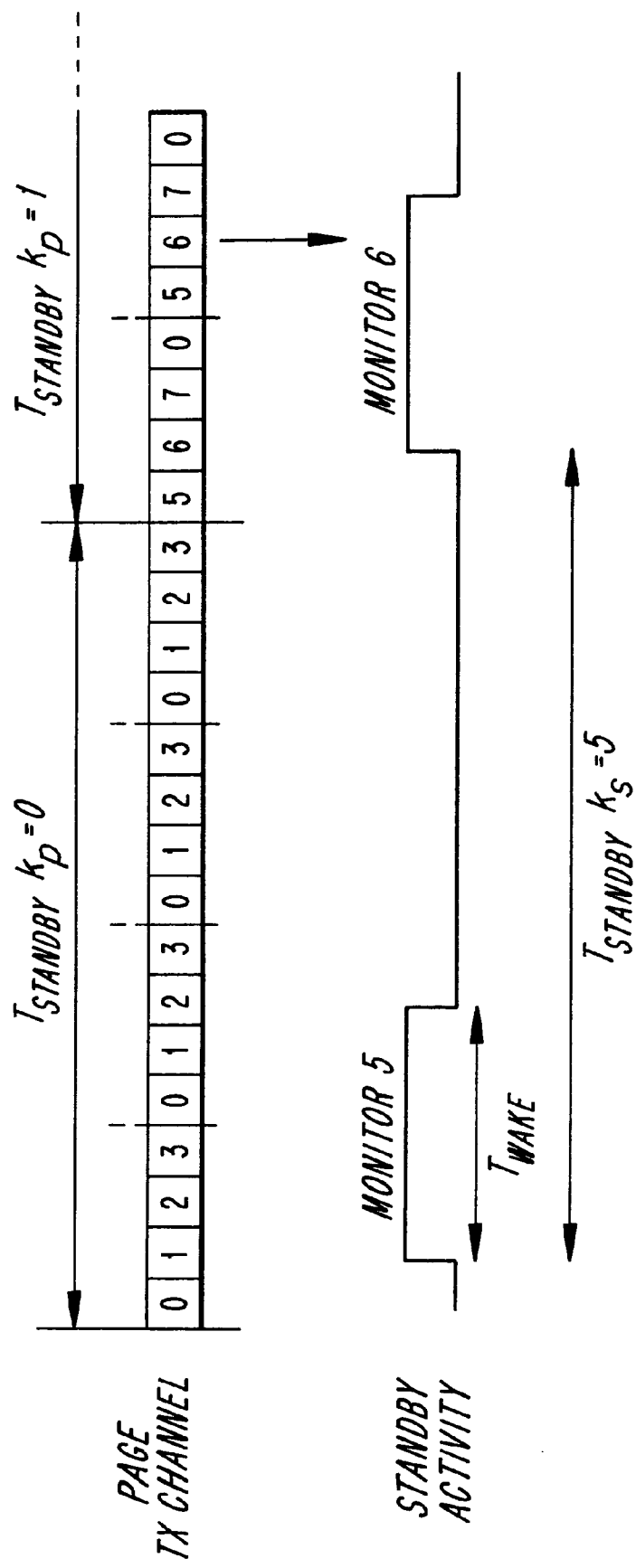
FIG. 6 is a timing diagram that illustrates the transmission of different page trains during different standby periods, in accordance with one aspect of the invention.
Figure 7:
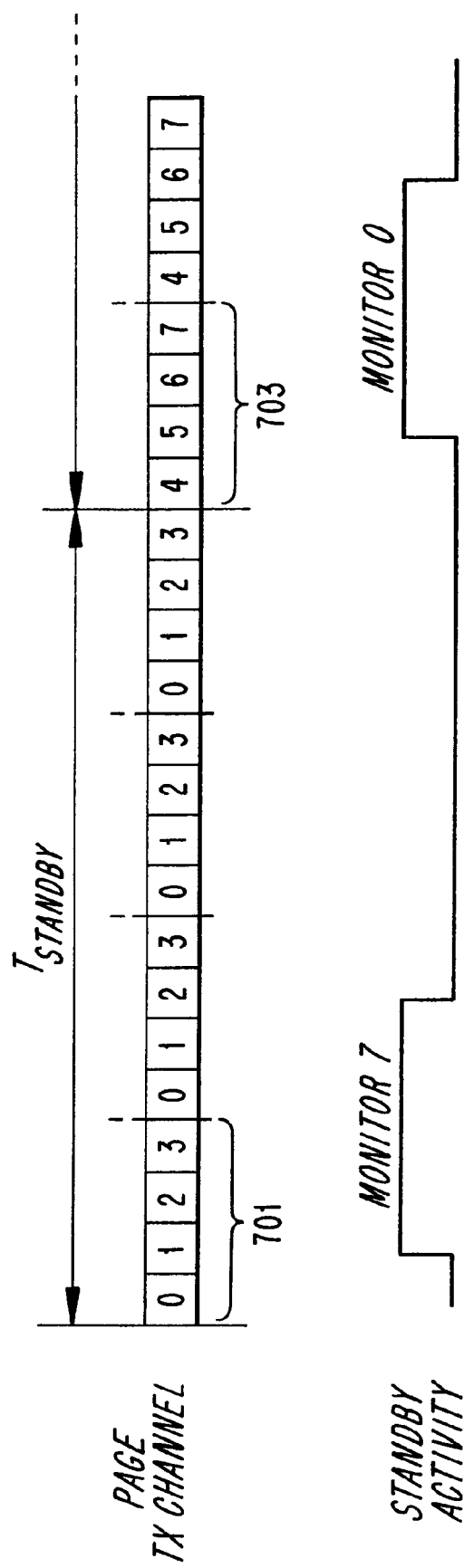
FIG. 7 is a timing diagram that illustrates inefficiencies that can be caused by non-optimized selection of page trains for transmission during different standby periods.

FIG. 6 shows an example of this aspect of the invention with M=4 and N=8. The total hop sequence comprises hops 0 through 7. The first page train comprises hops 0 through 3, while the second page train comprises hops 0 and 5 through 7. In the illustrated example, the page message arrives at the standby unit during the second wake-up period ($k_p$=1) at hop channel 6. During the first period, $k_p$=0, the paging unit uses a page train with the first four hop channels. However, notice that in the second period, $k_p$=1, hop channels {5,6,7,0} are chosen instead of the four remaining hop channels {4,5,6,7}. This is because the paging unit has to anticipate that the standby unit will also update its clock every $T_{standby}$ seconds. Failure to do this can result in the type of inefficiency illustrated in FIG. 7. In the example, the first page train 701 does not contain hop channel 7 and therefore a second attempt with a second page train 703 is tried after a period, $T_{standby}$. In this second page train 703, the remaining hop channels are used, namely {4,5,6,7}. As shown, the second attempt also fails because the standby unit has stepped its clock forward as well, so that hop channel 0 is being monitored. It is not until the following monitor period that a response will be received when the paging unit again uses the first page train 701 and the standby unit monitors hop channel 1.

In the considered case of FIG. 6 with M=4 and N=8, the paging unit uses two page trains, namely $$\text{train } A = \{hop_{mod8}(k_p), hop_{mod8}(k_p+1), hop_{mod8}(k_p+2), hop_{mod8}(k_p+3)\}$$

and $$\text{train } B = \{hop_{mod8}(k_p+4), hop_{mod8}(k_p+5), hop_{mod8}(k_p+6), hop_{mod8}(k_p+7)\}$$

where $k_p$ is the paging unit's clock value which is incremented every $T_{standby}$, and $hop_{modN}(x)$=hop(x mod N), so that the hop sequence is used in a circular manner.

It will be understood that when N>2M, more than two page trains must be used. These page trains should be applied sequentially, each for a duration of $T_{standby}$. In general, the number of required page trains is given by $N_T$=RNDUP(N/M), where RNDUP( ) is a function that rounds any non-integer up to the nearest integer.

For this general case, the page trains may be specified by the following equation:

$$\text{train } i = \{hop_{modN}(k_p+iM), hop_{modN}(k_p+iM+1), \ldots, hop_{modN}(k_p+iM+(M-1))\}$$

where i=0, . . . , ($N_T$−1).

Figure 8:
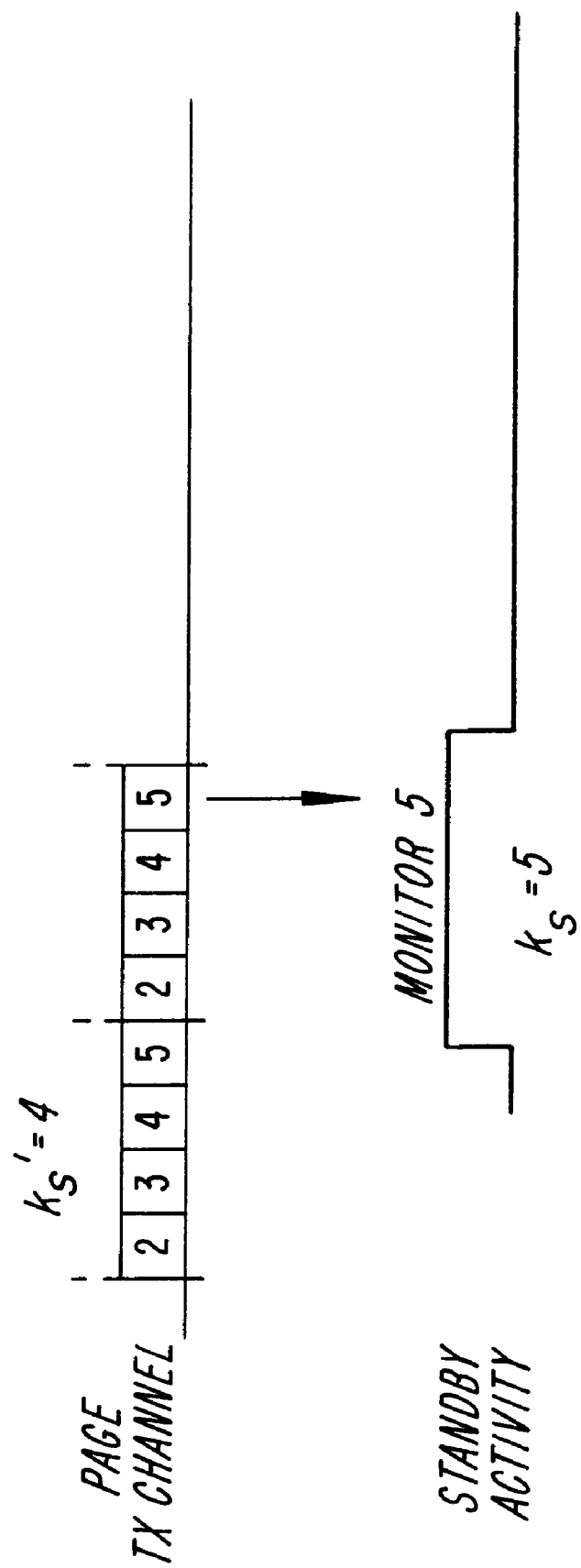
FIG. 8 is a timing diagram that illustrates the transmission of different page trains based on estimates of the standby unit's clock, in accordance with one aspect of the invention.

If errors on the channels are ignored, the above strategy assures page reception within a maximum delay of $N_T*T_{standby}$ seconds. This delay can be reduced when there is a way to estimate the value of the clock $k_s$ of the standby unit. If the standby clock is approximately known, the proper page train can be selected that covers the expected wake-up hop, as well as the hops just before and after the expected wake-up hop in order to allow for estimate errors. In the example of FIG. 6, the following page trains can be used:

$$\text{train } A = \{hop_{mod8}(k_s'-2), hop_{mod8}(k_s'-1), hop_{mod8}(k_s'), hop_{mod8}(k_s'+1)\}$$

and $$\text{train } B = \{hop_{mod8}(k_s'+2), hop_{mod8}(k_s'+3), hop_{mod8}(k_s'+4), hop_{mod8}(k_s'+5)\}$$

where $k_s'$ is the estimate of the standby clock in the paging unit. To illustrate the operation of this aspect of the invention, suppose the actual value of the standby clock is $k_s$=5, and that the estimate of the standby clock is $k_s'$=4. In this case, the first page train would look like the one in FIG. 8. Although the estimate was in error by one second, a fast access is still accomplished.

The above example is for the specific case where M=4 and N=8. In general, the page trains may be specified by the following equation:

$$\text{train } i = \{hop_{modN}(k_s'-\alpha+iM), hop_{modN}(k_s'-\alpha+iM+1), \ldots, hop_{modN}(k_s'-\alpha+iM+(M-1))\}$$

where i=0, . . . , ($N_T$−1);

and where $\alpha$ is a fixed offset value larger than zero. This offset, $\alpha$, is chosen such that train A contains hops leading and following the estimate hop, $hop_{modN}(k_s')$ in order to account for positive and negative errors in the clock estimate $k_s'$, respectively.

The estimate of the standby clock value may be derived from information obtained in a previous connection. That is, when two units are connected, they exchange some parameters including the clock values in both units. Each unit compares the other unit's clock value to its own in order to determine a clock offset value which can thereafter be added to its own clock value in order to estimate the present clock value in the other unit. During the connection, the clocks remain synchronized by a loose locking mechanism. For example, each unit may check its received signal timing with respect to its transmitted signal timing on early/late arrival, and adjust its clock accordingly. If the algorithm is leaky (i.e., the early/late compensation is not exact), both units will stabilize at an intermediate clock rate, somewhere between the clock rates of the individual units.

Once the connection is broken, the units retain the clock offset value which had been determined during the connection. Due to relative drift of each unit's clock, the clock estimates (i.e., the units' respective estimates of the other's clock as determined by the sum of its own clock value added to the retained clock offset value) become unreliable. For each unit, the uncertainty in the estimated clock value of the other unit depends on the amount of time that has elapsed since the disconnection and the rate of drift. For example, suppose the units have a relative drift of X parts per million (ppm). Then after a period of 1/X seconds, a unit's estimate of the other unit's clock value is still accurate within a second, and with the above-described technique, the access procedure would be as fast as when an exact replica of the internal clock in the standby unit had been known. It is stressed that the clock estimate $k_s'$ does not replace the existing clock value, $k_p$, in the paging unit's clock. Rather, the paging unit merely determines an offset value, $\Delta$, based on the difference between its own clock value and that of the other unit at the time the connection was established. The offset value, $\Delta$, is then added to the present value of the paging clock $k_p$ to give a present estimate of the other unit's clock value: $k_s'=k_p+\Delta$.

A unit preferably stores a complete list of relative estimates, $\Delta_i$, for each of the units that it has been connected with in the past. Prior to initialization, it checks the list to see whether there is an estimate $\Delta_i$ for the standby unit to be paged. If so, the paging unit uses an estimated clock value, $k_s'=k_p+\Delta_i$, to page the considered standby unit.

It will be apparent that the access delay during initial call setup depends on:

1) the number of hop channels covered in a single train;
2) the number of hop channels in the hopping sequence;

3) the amount of relative clock drift; and 4) the elapsed time since disconnection.

Together with the wake-up duration $T_{wake}$ and the standby period $T_{standby}$, the system can be optimized for short access delay and low-power consumption in standby mode.

Once a connection has been established, the paging unit keeps the clock phase at that phase for which the access succeeded. From that moment on, the connection clock rate at both units can be set to hop through the spectrum at a higher rate than the standby unit had been using. In addition, the units can also decide on a different (possibly longer) FH sequence to continue the connection with. This might be desirable if the paging hop pattern is less than ideal for maintaining the connection.

Figure 9:
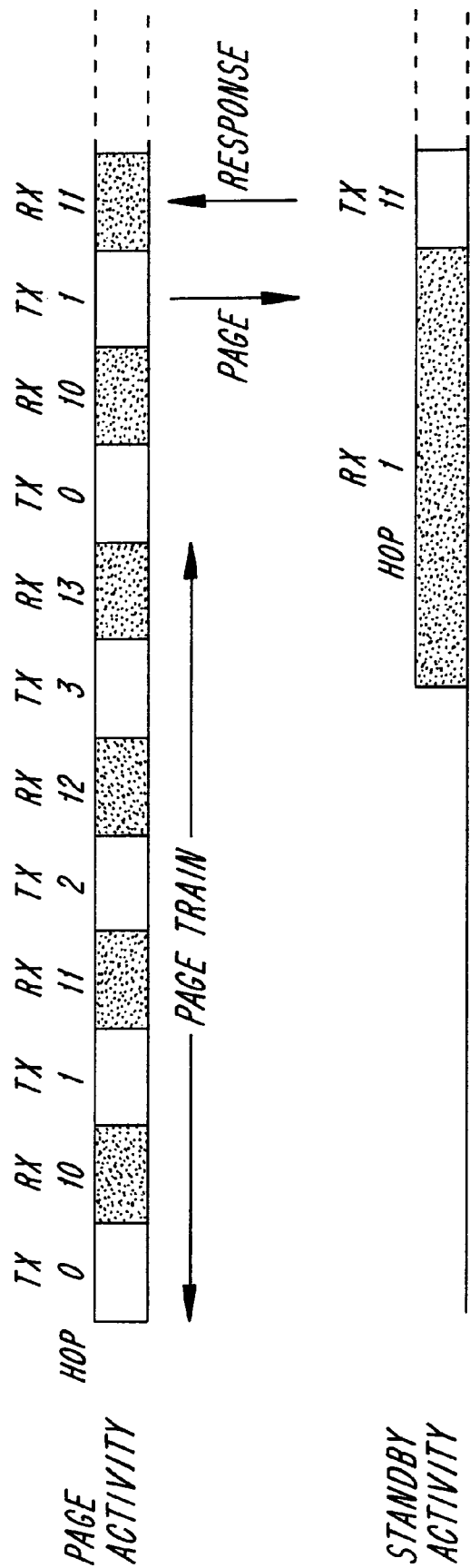
FIG. 9 is an embodiment of a response procedure in a time division duplex scheme, in accordance with the invention.
Figure 10:
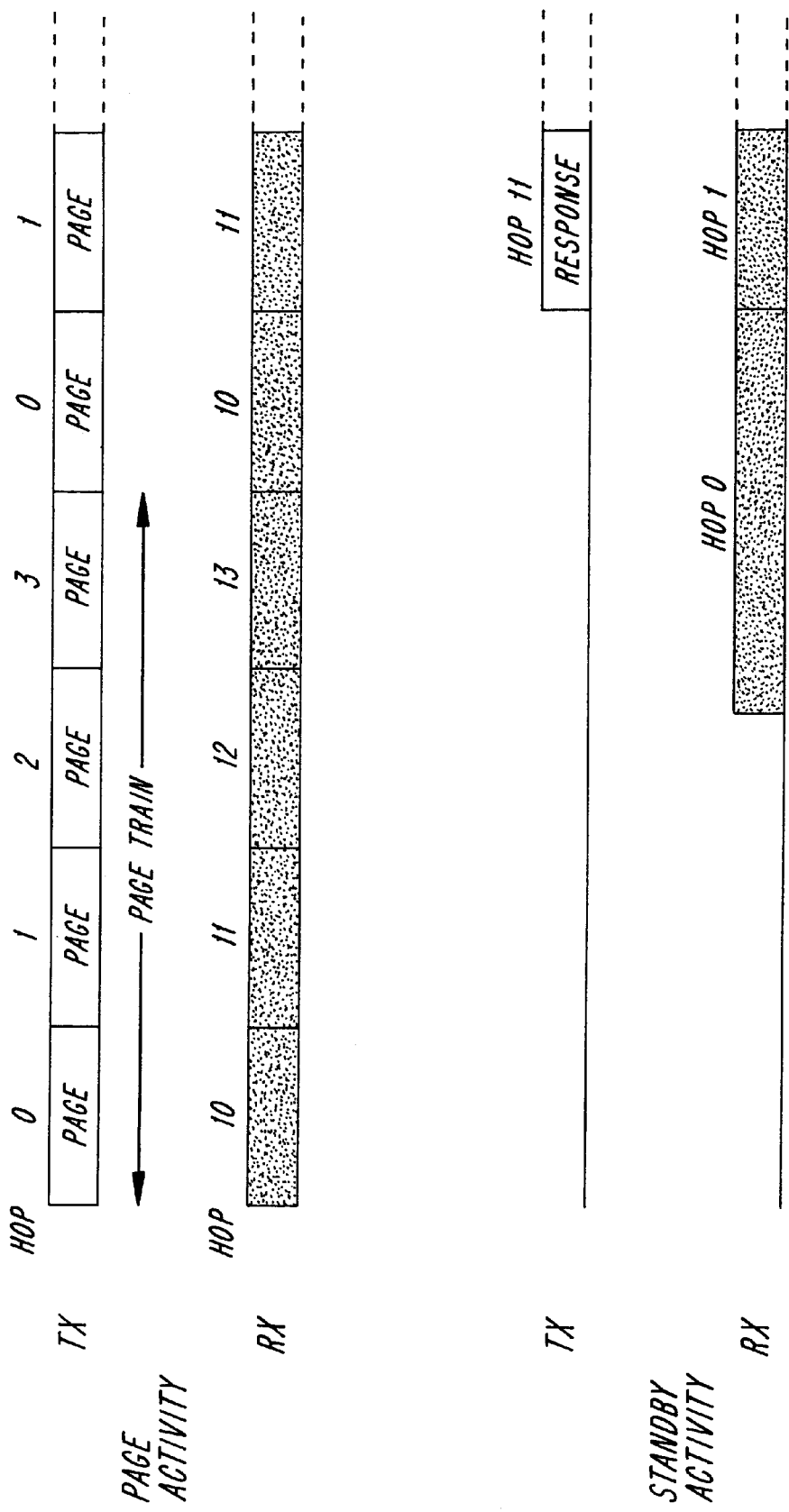
FIG. 10 is an embodiment of a response procedure in a frequency division duplex scheme, in accordance with the invention.
Figure 11:
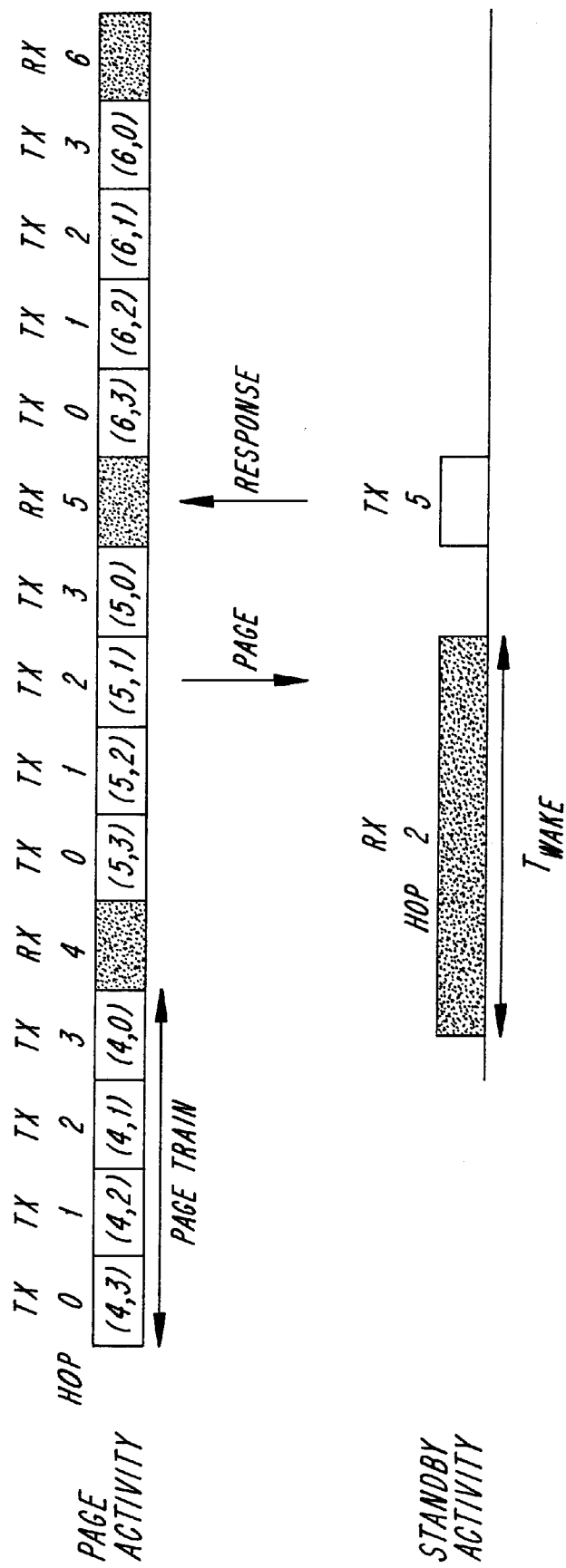
FIG. 11 is an alternative embodiment of a response procedure in accordance with the invention.
Figure 12:
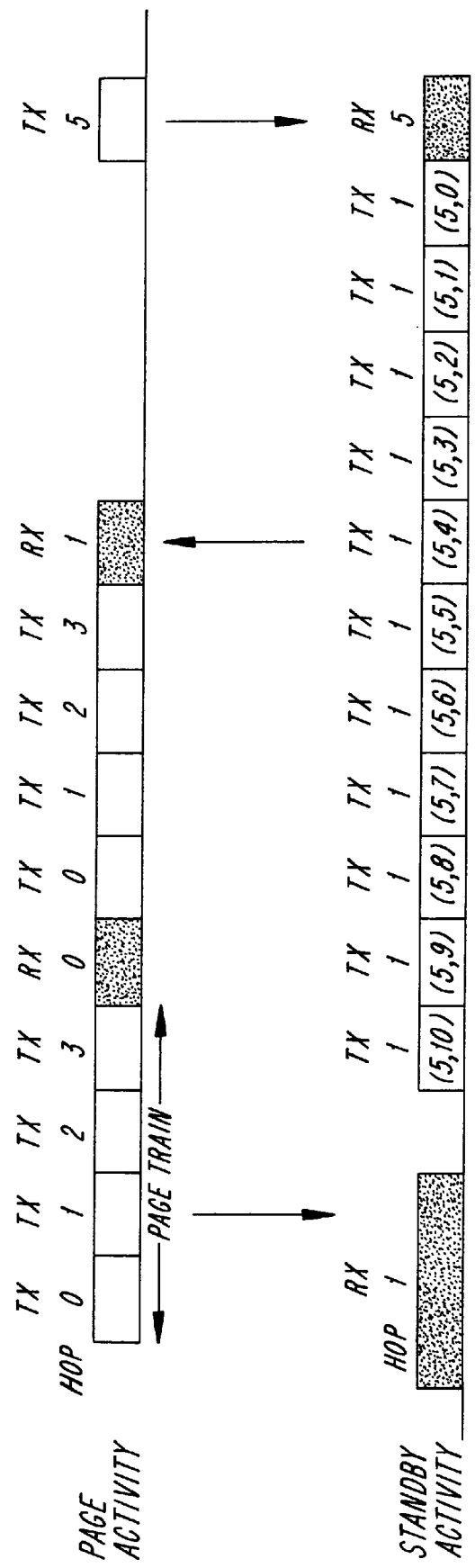
FIG. 12 is another alternative embodiment of a response procedure in accordance with the invention.

In the description above, only the communication from the paging unit to the standby unit was considered. In another aspect of the invention, the response of the standby unit to the paging unit can be accomplished in a number of ways. A response hop sequence S' can be defined in which the hops have a one-to-one correspondence with the hops in the page hop sequence, S. In case of a TDD scheme, the paging unit monitors the response hop $f'_k$ in S' just after it has transmitted a page message on hop $f_k$ in S, as illustrated in FIG. 9. In this example, the response sequence S' is derived from the page sequence S by adding a constant 10. The page message received in the standby unit in hop 1 is therefore acknowledged in hop 11. In case of FDD, it would transmit in hop $f_k$ and monitor in hop $f'_k$ simultaneously, as illustrated in FIG. 10. However, other response procedures are possible as well. For example, the paging units may monitor for response messages less frequently. In that case, the paging unit must indicate in its page message when it will listen, or a method must be used in which the standby unit repeatedly transmits response messages. An example of the first method is illustrated in FIG. 11. In each page message, the paging unit must indicate how many page hops remain before the paging unit will listen for a response. The number of remaining hops decrements for each additional page message. Preferably, the page message should also include the hop frequency on which the paging unit will listen. For example, in FIG. 11, page messages are sent repeatedly on hops 0 through 3. In each page message, the parameters (X,Y) are specified where X is the monitor hop, and Y is the number of hops left before the paging unit will listen for responses. In the first train, X=4 and Y decreases from 3 to 0. The standby unit receives the page message in hop 2. It waits for 1 hop and then transmits a response message in hop 5 as was indicated in the page message. This method increases the amount of data that must be sent in a paging message. In another method, the standby unit transmits the response message repeatedly on a single hop frequency. An example of such a method is illustrated in FIG. 12. After each page train, the paging unit listens on a hop for a response. The monitor hop frequency is different after each train. When the standby unit has received the paging message, it will return a response message using a hop frequency which corresponds to the hop in which the paging message was received. The response message is repeated for a fixed number of times, each time at the same frequency. For the sake of simplicity, in the example, the response hop is chosen equal to the successful page hop, hop number 1. To solve the recurrent problem of the paging unit now not knowing how long the standby unit will repeat its transmission after the paging unit has received the response in the second monitor event (in hop number 1), the response message could, for example, include an indication of how many response messages are left before the standby unit will listen again. This is similar to the method described in FIG. 11. In addition to the number of messages left, the hop number that the standby unit will listen in can be indicated.

The invention has been described with reference to a particular embodiment. However, it will be readily apparent to those skilled in the art that it is possible to embody the invention in specific forms other than those of the preferred embodiment described above. This may be done without departing from the spirit of the invention.

For example, the exemplary embodiment is applied to a system that utilizes frequency hopping. However, frequency hopping is merely one of a number of different types of channel hopping. The invention may be more generally applied to systems that use other types of channel hopping, such as the use of a code (spreading sequence) or any hopped entity that provides a channel, so long as it is not a time slot that is being hopped.

Thus, the preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. A method for establishing a connection between a paging unit and a standby unit in a channel hopping communications system, the method comprising the steps of:

activating the standby unit for an activation time period, $T_{wake}$, out of every standby time period, $T_{standby}$;

during each activation time period, causing the standby unit to monitor a selected channel for receipt of a paging message that includes a unique address associated with the standby unit, wherein the selected channel is selected from a plurality of channels, and wherein, for each subsequent activation time period, the selected channel is a subsequent one of the plurality of channels as specified by a hopping sequence; and repeatedly transmitting a page train from the paging unit to the standby unit, until a response is received from the standby unit, wherein each page train comprises a plurality of paging messages, each paging message being transmitted on a different one of a subset of the plurality of channels, whereby the paging unit and the standby unit achieve channel hopping synchronization based only on the unique address and knowledge of which one of the subset of the plurality of channels the paging message was received on by the standby unit.

2. The method of claim 1, wherein, for each page train, the subset of channels are ordered as specified by the hopping sequence.

3. The method of claim 2, wherein the hopping sequence is a pseudo-random sequence.

4. The method of claim 3, wherein the pseudo-random sequence is finite and determined by an address of the standby unit.

5. A method for establishing a connection between a paging unit and a standby unit in a channel hopping communications system, the method comprising the steps of:

activating the standby unit for an activation time period, $T_{wake}$, out of every standby time period, $T_{standby}$;

during each activation time period, causing the standby unit to monitor a selected channel for receipt of a paging message, wherein the selected channel is selected from a plurality of channels, and wherein, for each subsequent activation time period, the selected channel is a subsequent one of the plurality of channels as specified by a hopping sequence; and repeatedly transmitting a page train from the paging unit to the standby unit, until a response is received from the standby unit, wherein each page train comprises a plurality of paging messages, each paging message being transmitted on a different one of a subset of the plurality of channels, wherein:

the selection of a channel to be monitored by the standby unit is a function of a value of a free-running clock in the standby unit; and the page train is selected from a plurality of page trains, the selection being a function of a value of a free-running clock in the paging unit.

6. A method for establishing a connection between a paging unit and a standby unit in a channel hopping communications system, the method comprising the steps of:

activating the standby unit for an activation time period, $T_{wake}$, out of every standby time period, $T_{standby}$;

during each activation time period, causing the standby unit to monitor a selected channel for receipt of a paging message, wherein the selected channel is selected from a plurality of channels, and wherein, for each subsequent activation time period, the selected channel is a subsequent one of the plurality of channels as specified by a hopping sequence; and repeatedly transmitting a page train from the paging unit to the standby unit, until a response is received from the standby unit, wherein each page train comprises a plurality of paging messages, each paging message being transmitted on a different one of a subset of the plurality of channels, wherein the duration of each page train is substantially equal to the activation time period, $T_{wake}$.

7. The method of claim 1, wherein the duration of each page train is less than the activation time period, $T_{wake}$.

8. A method for establishing a connection between a paging unit and a standby unit in a channel hopping communications system, the method comprising the steps of:

activating the standby unit for an activation time period, $T_{wake}$, out of every standby time period, $T_{standby}$;

during each activation time period, causing the standby unit to monitor a selected channel for receipt of a paging message, wherein the selected channel is selected from a plurality of channels, and wherein, for each subsequent activation time period, the selected channel is a subsequent one of the plurality of channels as specified by a hopping sequence; and repeatedly transmitting a page train from the paging unit to the standby unit, until a response is received from the standby unit, wherein each page train comprises a plurality of paging messages, each paging message being transmitted on a different one of a subset of the plurality of channels, wherein the step of repeatedly transmitting the page train from the paging unit to the standby unit comprises:

selecting a first page train for use during a first standby time period;

repeatedly transmitting the first page train from the paging unit to the standby unit during the first standby time period; and selecting a second page train for use during a subsequent standby time period, wherein the second page train is transmitted on a different subset of channels from that used for transmitting the first page train.

9. A method for establishing a connection between a paging unit and a standby unit in a channel hopping communications system, the method comprising the steps of:

activating the standby unit for an activation time period, $T_{wake}$, out of very standby time period, $T_{standby}$;

during each activation time period, causing the standby unit to monitor a selected channel for receipt of a paging message, wherein the selected channel is selected from a plurality of channels, and wherein, for each subsequent activation time period, the selected channel is a subsequent one of the plurality of channels as specified by a hopping sequence; and repeatedly transmitting a page train from the paging unit to the standby unit, until a response is received from the standby unit, wherein each page train comprises a plurality of paging messages, each paging message being transmitted on a different one of a subset of the plurality of channels, wherein each page train is transmitted on a subset of channels that are selected from the plurality of channels in accordance with the following equation:

$$train\ i = \{hop_{modN}(k_p+iM),\ hop_{modN}(k_p+iM+1),\ \ldots,\ hop_{modN}(k_p+iM+(M-1))\}$$

where $k_p$ is a clock value of the paging unit, the paging unit clock value being updated every $T_{standby}$ period, N is the number of channels in the hopping sequence, $T_{page}$ is the duration of a page message, $M = INT(T_{wake}/T_{page}) - 1$, where $INT(\ )$ is a function that leaves only the integer part of a variable, the number of page trains, $N_T$, is given by $N_T = RNDUP(N/M)$, where $RNDUP(\ )$ is a function that rounds any non-integer up to the nearest integer, $i = 0, \ldots, (N_T-1)$, and $hop_{modN}(x) = hop(x\ mod\ N)$.

10. A method for establishing a connection between a paging unit and a standby unit in a channel hopping communications system, the method comprising the steps of:

activating the standby unit for an activation time period, $T_{wake}$, out of every standby time period, $T_{standby}$;

during each activation time period, causing the standby unit to monitor a selected channel for receipt of a paging message, wherein the selected channel is selected from a plurality of channels, and wherein, for each subsequent activation time period, the selected channel is a subsequent one of the plurality of channels as specified by a hopping sequence; and repeatedly transmitting a page train from the paging unit to the standby unit, until a response is received from the standby unit, wherein each page train comprises a plurality of paging messages, each paging message being transmitted on a different one of a subset of the plurality of channels, wherein each page train is transmitted on a subset of channels that are selected from the plurality of channels in accordance with the following equation:

$$train\ i = \{hop_{modN}(k_s'-\alpha+iM),\ hop_{modN}(k_s'-\alpha+iM+1),\ \ldots,\ hop_{modN}(k_s'-\alpha+iM+(M-1))\}$$

where $k_s'$ is an estimate of a clock value of the standby unit, the standby unit's clock value being updated every $T_{standby}$ period, $\alpha$ is a fixed offset value larger than zero, N is the number of channels in the hopping sequence, $T_{page}$ is the duration of a page message, $M = INT(T_{wake}/T_{page}) - 1$, where $INT( )$ is a function that leaves only the integer part of a variable, the number of page trains, $N_T$, is given by $N_T = RNDUP(N/M)$, where $RNDUP( )$ is a function that rounds any non-integer up to the nearest integer, $i = 0, \ldots, (N_T - 1)$, and $hop_{modN}(x) = hop(x \mod N)$.

11. The method of claim 10, wherein the estimate of the standby unit's clock is determined from a present clock value of a paging unit clock, adjusted by a previously determined offset between standby unit and paging unit clock values.

12. The method of claim 11, wherein the previously determined offset is stored in a non-volatile memory for future access attempts.

13. The method of claim 1, wherein the channel hopping communications system is a frequency hopping communications system.

14. The method of claim 1, wherein the channel hopping communications system is a code hopping communications system.

15. An apparatus for establishing a connection between a paging unit and a standby unit in a channel hopping communications system, the apparatus comprising:

means for activating the standby unit for an activation time period, $T_{wake}$, out of every standby time period, $T_{standby}$;

means for causing the standby unit to monitor a selected channel for receipt of a paging message during each activation time period, wherein the paging message includes a unique address associated with the standby unit wherein the selected channel is selected from a plurality of channels, and wherein, for each subsequent activation time period, the selected channel is a subsequent one of the plurality of channels as specified by a hopping sequence; and means for repeatedly transmitting a page train from the paging unit to the standby unit, until a response is received from the standby unit, wherein each page train comprises a plurality of paging messages, each paging message being transmitted on a different one of a subset of the plurality of channels, whereby the paging unit and the standby unit achieve channel hopping synchronization based only on the unique address and knowledge of which one of the subset of the plurality of channels the paging message was received on by the standby unit.

16. The apparatus of claim 15, wherein, for each page train, the subset of channels are ordered as specified by the hopping sequence.

17. The apparatus of claim 16, wherein the hopping sequence is a pseudo-random sequence.

18. The apparatus of claim 17, wherein the pseudorandom sequence is finite and determined by an address of the standby unit.

19. An apparatus for establishing a connection between a paging unit and a standby unit in a channel hopping communications system, the apparatus comprising:

means for activating the standby unit for an activation time period, $T_{wake}$, out of every standby time period, $T_{standby}$;

means for causing the standby unit to monitor a selected channel for receipt of a paging message during each activation time period, wherein the selected channel is selected from a plurality of channels, and wherein, for each subsequent activation time period, the selected channel is a subsequent one of the plurality of channels as specified by a hopping sequence; and means for repeatedly transmitting a page train from the paging unit to the standby unit, until a response is received from the standby unit, wherein each page train comprises a plurality of paging messages, each paging message being transmitted on a different one of a subset of the plurality of channels, wherein:
the selection of a channel to be monitored by the standby unit is a function of a value of a free-running clock in the standby unit; and
the page train is selected from a plurality of page trains, the selection being a function of a value of a free-running clock in the paging unit.

20. An apparatus for establishing a connection between a paging unit and a standby unit in a channel hopping communications system, the apparatus comprising:

means for activating the standby unit for an activation time period, $T_{wake}$, out of every standby time period, $T_{standby}$;

means for causing the standby unit to monitor a selected channel for receipt of a paging message during each activation time period, wherein the selected channel is selected from a plurality of channels, and wherein, for each subsequent activation time period, the selected channel is a subsequent one of the plurality of channels as specified by a hopping sequence; and means for repeatedly transmitting a page train from the paging unit to the standby unit, until a response is received from the standby unit, wherein each page train comprises a plurality of paging messages, each paging message being transmitted on a different one of a subset of the plurality of channels, wherein the duration of each page train is substantially equal to the activation time period, $T_{wake}$.

21. The apparatus of claim 15, wherein the duration of each page train is less than the activation time period, $T_{wake}$.

22. An apparatus for establishing a connection between a paging unit and a standby unit in a channel hopping communications system, the apparatus comprising:

means for activating the standby unit for an activation time period, $T_{wake}$, out of every standby time period, $T_{standby}$;

means for causing the standby unit to monitor a selected channel for receipt of a paging message during each activation time period, wherein the selected channel is selected from a plurality of channels, and wherein, for each subsequent activation time period, the selected channel is a subsequent one of the plurality of channels as specified by a hopping sequence; and means for repeatedly transmitting a page train from the paging unit to the standby unit, until a response is received from the standby unit, wherein each page train comprises a plurality of paging messages, each paging message being transmitted on a different one of a subset of the plurality of channels, wherein the means for repeatedly transmitting the page train from the paging unit to the standby unit comprises:
means for selecting a first page train for use during a first standby time period;
means for repeatedly transmitting the first page train from the paging unit to the standby unit during the first standby time period; and means for selecting a second page train for use during a subsequent standby time period, wherein the second page train is transmitted on a different subset of channels from that used for transmitting the first page train.

23. An apparatus for establishing a connection between a paging unit and a standby unit in a channel hopping communications system, the apparatus comprising:

means for activating the standby unit for an activation time period, $T_{wake}$, out of every standby time period, $T_{standby}$;

means for causing the standby unit to monitor a selected channel for receipt of a paging message during each activation time period, wherein the selected channel is selected from a plurality of channels, and wherein, for each subsequent activation time period, the selected channel is a subsequent one of the plurality of channels as specified by a hopping sequence; and means for repeatedly transmitting a page train from the paging unit to the standby unit, until a response is received from the standby unit, wherein each page train comprises a plurality of paging messages, each paging message being transmitted on a different one of a subset of the plurality of channels, wherein each page train is transmitted on a subset of channels that are selected from the plurality of channels in accordance with the following equation:

$$\text{train } i = \{hop_{modN}(k_p + iM), hop_{modN}(k_p + iM + 1), \ldots, hop_{modN}(k_p + iM + (M-1))\}$$

where $k_p$ is a clock value of the paging unit, the paging unit clock value being updated every $T_{standby}$ period,
N is the number of channels in the hopping sequence,
$T_{page}$ is the duration of a page message,
$M = \text{INT}(T_{wake}/T_{page}) - 1$, where INT( ) is a function that leaves only the integer part of a variable,
the number of page trains, $N_T$, is given by $N_T = \text{RNDUP}(N/M)$, where RNDUP( ) is a function that rounds any non-integer up to the nearest integer,
$i = 0, \ldots, (N_T - 1)$,
and $hop_{modN}(x) = hop(x \bmod N)$.

24. An apparatus for establishing a connection between a paging unit and a standby unit in a channel hopping communications system, the apparatus comprising:

means for activating the standby unit for an activation time period, $T_{wake}$, out of every standby time period, $T_{standby}$;

means for causing the standby unit to monitor a selected channel for receipt of a paging message during each activation time period, wherein the selected channel is selected from a plurality of channels, and wherein, for each subsequent activation time period, the selected channel is a subsequent one of the plurality of channels as specified by a hopping sequence; and means for repeatedly transmitting a page train from the paging unit to the standby unit, until a response is received from the standby unit, wherein each page train comprises a plurality of paging messages, each paging message being transmitted on a different one of a subset of the plurality of channels, wherein each page train is transmitted on a subset of channels that are selected from the plurality of channels in accordance with the following equation:

$$\text{train } i = \{hop_{modN}(k_s' - \alpha + iM), hop_{modN}(k_s' - \alpha + iM + 1), \ldots, hop_{modN}(k_s' - \alpha + iM + (M-1))\}$$

where $k_s'$ is an estimate of a clock value of the standby unit, the standby unit's clock value being updated every $T_{standby}$ period,
$\alpha$ is a fixed offset value larger than zero,
N is the number of channels in the hopping sequence,
$T_{page}$ is the duration of a page message,
$M = \text{INT}(T_{wake}/T_{page}) - 1$, where INT( ) is a function that leaves only the integer part of a variable,
the number of page trains, $N_T$, is given by $N_T = \text{RNDUP}(N/M)$, where RNDUP( ) is a function that rounds any non-integer up to the nearest integer,
$i = 0, \ldots, (N_T - 1)$,
and $hop_{modN}(x) = hop(x \bmod N)$.

25. The apparatus of claim 24, wherein the estimate of the standby unit's clock is determined from a present clock value of a paging unit clock, adjusted by a previously determined offset between standby unit and paging unit clock values.

26. The apparatus of claim 25, further comprising a non-volatile memory for storing the previously determined offset for use in future access attempts.

27. The apparatus of claim 15, wherein the channel hopping communications system is a frequency hopping communications system.

28. The apparatus of claim 15, wherein the channel hopping communications system is a code hopping communications system.

29. The method of claim 5, wherein, for each page train, the subset of channels are ordered as specified by the hopping sequence.

30. The method of claim 29, wherein the hopping sequence is a pseudo-random sequence.

31. The method of claim 30, wherein the pseudo-random sequence is finite and determined by an address of the standby unit.

32. The method of claim 5, wherein the duration of each page train is less than the activation time period, $T_{wake}$.

33. The method of claim 5, wherein the channel hopping communications system is a frequency hopping communications system.

34. The method of claim 5, wherein the channel hopping communications system is a code hopping communications system.

35. The method of claim 6, wherein, for each page train, the subset of channels are ordered as specified by the hopping sequence.

36. The method of claim 35, wherein the hopping sequence is a pseudo-random sequence.

37. The method of claim 36, wherein the pseudo-random sequence is finite and determined by an address of the standby unit.

38. The method of claim 6, wherein the channel hopping communications system is a frequency hopping communications system.

39. The method of claim 6, wherein the channel hopping communications system is a code hopping communications system.

40. The method of claim 8, wherein, for each page train, the subset of channels are ordered as specified by the hopping sequence.

41. The method of claim 40, wherein the hopping sequence is a pseudo-random sequence.

42. The method of claim 41, wherein the pseudo-random sequence is finite and determined by an address of the standby unit.

43. The method of claim 8, wherein the duration of each page train is less than the activation time period, $T_{wake}$.

44. The method of claim 8, wherein the channel hopping communications system is a frequency hopping communications system.

45. The method of claim 8, wherein the channel hopping communications system is a code hopping communications system.

46. The method of claim 9, wherein, for each page train, the subset of channels are ordered as specified by the hopping sequence.

47. The method of claim 46, wherein the hopping sequence is a pseudo-random sequence.

48. The method of claim 47, wherein the pseudo-random sequence is finite and determined by an address of the standby unit.

49. The method of claim 9, wherein the duration of each page train is less than the activation time period, $T_{wake}$.

50. The method of claim 9, wherein the channel hopping communications system is a frequency hopping communications system.

51. The method of claim 9, wherein the channel hopping communications system is a code hopping communications system.

52. The method of claim 10 wherein, for each page train, the subset of channels are ordered as specified by the hopping sequence.

53. The method of claim 52, wherein the hopping sequence is a pseudo-random sequence.

54. The method of claim 53, wherein the pseudo-random sequence is finite and determined by an address of the standby unit.

55. The method of claim 10, wherein the duration of each page train is less than the activation time period, $T_{wake}$.

56. The method of claim 10, wherein the channel hopping communications system is a frequency hopping communications system.

57. The method of claim 10, wherein the channel hopping communications system is a code hopping communications system.

58. The apparatus of claim 19, wherein, for each page train, the subset of channels are ordered as specified by the hopping sequence.

59. The apparatus of claim 58, wherein the hopping sequence is a pseudo-random sequence.

60. The apparatus of claim 59, wherein the pseudo-random sequence is finite and determined by an address of the standby unit.

61. The apparatus of claim 19, wherein the duration of each page train is less than the activation time period, $T_{wake}$.

62. The apparatus of claim 19, wherein the channel hopping communications system is a frequency hopping communications system.

63. The apparatus of claim 19, wherein the channel hopping communications system is a code hopping communications system.

64. The apparatus of claim 20, wherein, for each page train, the subset of channels are ordered as specified by the hopping sequence.

65. The apparatus of claim 64, wherein the hopping sequence is a pseudo-random sequence.

66. The apparatus of claim 65, wherein the pseudo-random sequence is finite and determined by an address of the standby unit.

67. The apparatus of claim 20, wherein the channel hopping communications system is a frequency hopping communications system.

68. The apparatus of claim 20, wherein the channel hopping communications system is a code hopping communications system.

69. The apparatus of claim 22, wherein, for each page train, the subset of channels are ordered as specified by the hopping sequence.

70. The apparatus of claim 69, wherein the hopping sequence is a pseudo-random sequence.

71. The apparatus of claim 70, wherein the pseudo-random sequence is finite and determined by an address of the standby unit.

72. The apparatus of claim 22, wherein the duration of each page train is less than the activation time period, $T_{wake}$.

73. The apparatus of claim 22, wherein the channel hopping communications system is a frequency hopping communications system.

74. The apparatus of claim 22, wherein the channel hopping communications system is a code hopping communications system.

75. The apparatus of claim 23, wherein, for each page train, the subset of channels are ordered as specified by the hopping sequence.

76. The apparatus of claim 75, wherein the hopping sequence is a pseudo-random sequence.

77. The apparatus of claim 76, wherein the pseudo-random sequence is finite and determined by an address of the standby unit.

78. The apparatus of claim 23, wherein the duration of each page train is less than the activation time period, $T_{wake}$.

79. The apparatus of claim 23, wherein the channel hopping communications system is a frequency hopping communications system.

80. The apparatus of claim 23, wherein the channel hopping communications system is a code hopping communications system.

81. The apparatus of claim 24, wherein, for each page train, the subset of channels are ordered as specified by the hopping sequence.

82. The apparatus of claim 81, wherein the hopping sequence is a pseudo-random sequence.

83. The apparatus of claim 82, wherein the pseudo-random sequence is finite and determined by an address of the standby unit.

84. The apparatus of claim 24, wherein the duration of each page train is less than the activation time period, $T_{wake}$.

85. The apparatus of claim 24, wherein the channel hopping communications system is a frequency hopping communications system.

86. The apparatus of claim 24, wherein the channel hopping communications system is a code hopping communications system.

* * * * *